US012463881B2

(12) United States Patent
Rangarajan et al.

(10) Patent No.: US 12,463,881 B2
(45) Date of Patent: Nov. 4, 2025

(54) USING GENERIC ROUTING ENCAPSULATION (GRE) FOR CARRYING MONITORED NETWORK TRAFFIC

(71) Applicant: Arista Networks, Inc., Santa Clara, CA (US)

(72) Inventors: Vijayaraghavan Rangarajan, Fremont, CA (US); James Pang, Vancouver (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 18/391,293

(22) Filed: Dec. 20, 2023

(65) Prior Publication Data
US 2025/0211505 A1 Jun. 26, 2025

(51) Int. Cl.
*H04L 43/062* (2022.01)
*H04L 43/028* (2022.01)
*H04L 43/106* (2022.01)

(52) U.S. Cl.
CPC .......... *H04L 43/062* (2013.01); *H04L 43/028* (2013.01); *H04L 43/106* (2013.01)

(58) Field of Classification Search
CPC . H04L 43/062; H04L 2212/00; H04L 43/106; H04L 43/0864; H04L 43/087; H04L 43/02; H04L 69/22
See application file for complete search history.

(56) References Cited

U.S. PATENT DOCUMENTS

| | | | | |
|---|---|---|---|---|
| 7,899,048 | B1* | 3/2011 | Walker | H04L 12/4641 709/224 |
| 8,520,540 | B1* | 8/2013 | Foschiano | H04L 43/106 370/252 |
| 9,503,342 | B2* | 11/2016 | Scott | H04L 43/062 |
| 9,736,051 | B2* | 8/2017 | Nachum | H04L 43/106 |
| 9,769,044 | B1* | 9/2017 | Cirkovic | H04L 43/0852 |
| 9,813,323 | B2* | 11/2017 | Emmadi | H04L 41/0893 |
| 10,601,610 | B2* | 3/2020 | Poulin | H04L 12/4633 |
| 10,887,212 | B2* | 1/2021 | Frattura | H04L 63/1416 |
| 12,170,603 | B2* | 12/2024 | Bhatia | H04L 43/026 |

(Continued)

FOREIGN PATENT DOCUMENTS

| | | | | |
|---|---|---|---|---|
| KR | 100601855 | B1 * | 7/2006 | H04L 69/22 |
| WO | WO-2015032073 | A1 * | 3/2015 | H04L 45/30 |

OTHER PUBLICATIONS

European Patent Office, Extended European Search Report, EP Application No. 24222206.5, May 26, 2025, 10 pgs.

*Primary Examiner* — Alex Tran
(74) *Attorney, Agent, or Firm* — Fountainhead Law Group, PC

(57) ABSTRACT

Techniques for leveraging Generic Routing Encapsulation (GRE) to carry monitored network traffic (i.e., network packets that are received and matched to a monitoring policy by a network monitoring system/fabric) are provided. In one set of embodiments, these techniques involve encapsulating a monitored packet using GRE by inserting the monitored packet in an unmodified form into a payload portion of a GRE packet and inserting metadata regarding the monitored packet into a header portion of the GRE packet, where the header portion employs a non-standard GRE header format that is designed to accommodate such metadata.

17 Claims, 7 Drawing Sheets

(56) References Cited

U.S. PATENT DOCUMENTS

| | | |
|---|---|---|
| 2013/0235747 A1* | 9/2013 | Le .......................... H04L 45/70 370/252 |
| 2016/0099853 A1* | 4/2016 | Nedeltchev ......... H04L 43/0888 370/253 |
| 2017/0099197 A1 | 4/2017 | Raney |
| 2021/0144075 A1* | 5/2021 | Indiresan ............ H04L 63/0272 |
| 2022/0294712 A1 | 9/2022 | Rangarajan et al. |

* cited by examiner

STANDARD GRE HEADER FORMAT 300

| Bit | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
|---|---|---|---|---|---|---|---|---|---|---|---|---|---|---|---|---|---|---|---|---|---|---|---|---|---|---|---|---|---|---|---|---|
| 0 | 0 | | 1 | 0 | Reserved | | | | | | | | | ver | | | Protocol type | | | | | | | | | | | | | | | |
| 32 | Undefined (GRE Key when Key Present bit set) | | | | | | | | | | | | | | | | | | | | | | | | | | | | | | | |

*FIG. 3*

Non-Standard GRE Header Format 500

| Bit | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
|---|---|---|---|---|---|---|---|---|---|---|---|---|---|---|---|---|---|---|---|---|---|---|---|---|---|---|---|---|---|---|---|---|
| 0 | 0 | | 1 | 0 | Reserved ||||||||| ver ||| Protocol type (0xD28B) |||||||||||||||
| 32 | Entropy ||||||||||||||| Reserved |||||||||||||||||
| 64 | Protocol subtype (0x5) ||||||||||||||| Version (0x1) |||||||||||||||||
| 96 | Switch-id ||||||||||||||| Port-id |||||||||||||||||
| 128 | Policy-id ||||||||||||||| Reserved |||||||||||||||||

*FIG. 5*

Non-Standard GRE Header Format 600

| Bit | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
|---|---|---|---|---|---|---|---|---|---|---|---|---|---|---|---|---|---|---|---|---|---|---|---|---|---|---|---|---|---|---|---|---|
| 0 | 0 | | 0 | 0 | Reserved ||||||||| ver ||| Protocol type (0xD28B) |||||||||||||||
| 32 | Protocol subtype (0x6) ||||||||||||||| Version (0x1) |||||||||||||||||
| 64 | Switch-id ||||||||||||||| Port-id |||||||||||||||||
| 96 | Policy-id ||||||||||||||| Entropy |||||||||||||||||

*FIG. 6*

NON-STANDARD GRE HEADER FORMAT 700

| Bit | 0 | 1 | 2 | 3 | 4 5 6 7 8 9 0 1 2 3 4 5 | 6 7 8 9 0 1 2 3 4 5 6 7 8 9 0 1 |
|---|---|---|---|---|---|---|
| 0 | 0 | | 1 | 0 | Reserved | ver | Protocol type (0xD28B) |
| 32 | | | | | Entropy | Reserved |
| 64 | | | | | Protocol subtype (0x7) | Version (0x1) |
| 96 | | | | | Switch-id | Port-id |
| 128 | | | | | Policy-id | Reserved |
| 160 | | | | | Timestamp (seconds) | |
| 192 | | | | | Timestamp (nanoseconds) | |

*FIG. 7*

NON-STANDARD GRE HEADER FORMAT 800

| Bit | 0 | 1 | 2 | 3 | 4 5 6 7 8 9 0 1 2 3 4 5 | ver | Protocol type (0x88B5) |
|---|---|---|---|---|---|---|---|
| 0 | 0 | | 1 | 0 | Reserved | ver | Protocol type (0x88B5) |
| 32 | | | | | Switch-id | Port-id | Policy-id |

*FIG. 8*

USING GENERIC ROUTING ENCAPSULATION (GRE) FOR CARRYING MONITORED NETWORK TRAFFIC

BACKGROUND

Network monitoring systems, also known as network visibility systems or network packet brokers (NPBs), receive network traffic that is captured at various points in a production network, match the captured traffic to monitoring policies, and transmit the matched traffic (referred to herein as "monitored" traffic) to one or more monitoring tools for analysis and/or logging. Typically, each monitored packet is tagged with metadata prior to being sent out, thereby allowing the packet to be directed to an appropriate tool (and/or allowing the receiving monitoring tool to carry out its analysis on the packet) based on such information.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 3 depicts a standard GRE header format in accordance with certain embodiments of the present disclosure.

FIGS. 5, 6, 7, and 8 depict non-standard GRE header formats in accordance with certain embodiments of the present disclosure.

DETAILED DESCRIPTION

In the following description, for purposes of explanation, numerous examples and details are set forth in order to provide an understanding of embodiments of the present disclosure. Particular embodiments as expressed in the claims may include some or all of the features in these examples, alone or in combination with other features described below, and may further include modifications and equivalents of the features and concepts described herein.

Embodiments of the present disclosure describe techniques for leveraging Generic Routing Encapsulation (GRE) to carry monitored network traffic (i.e., network packets that are received and matched to a monitoring policy by a network monitoring system or fabric). GRE is a standardized tunneling protocol that is designed to encapsulate network layer protocol packets (e.g., Internet Protocol (IP) packets) into a format known as GRE packets. Once encapsulated in this manner, the GRE packets can be tunneled over a Layer 3 (L3) network.

In one set of embodiments, the techniques of the present disclosure involve encapsulating a monitored packet using GRE by inserting the monitored packet in an unmodified form into a payload portion of a GRE packet and inserting monitoring-related metadata for the monitored packet into a header portion of the GRE packet, where the header portion employs a new, non-standard GRE header format that is designed to accommodate such metadata. With these techniques, the monitored packet can be routed to a monitoring tool via the GRE tunnel in a manner that advantageously provides ample space for the monitored packet's metadata.

1. Example Environment and Solution Overview

Figure 1:
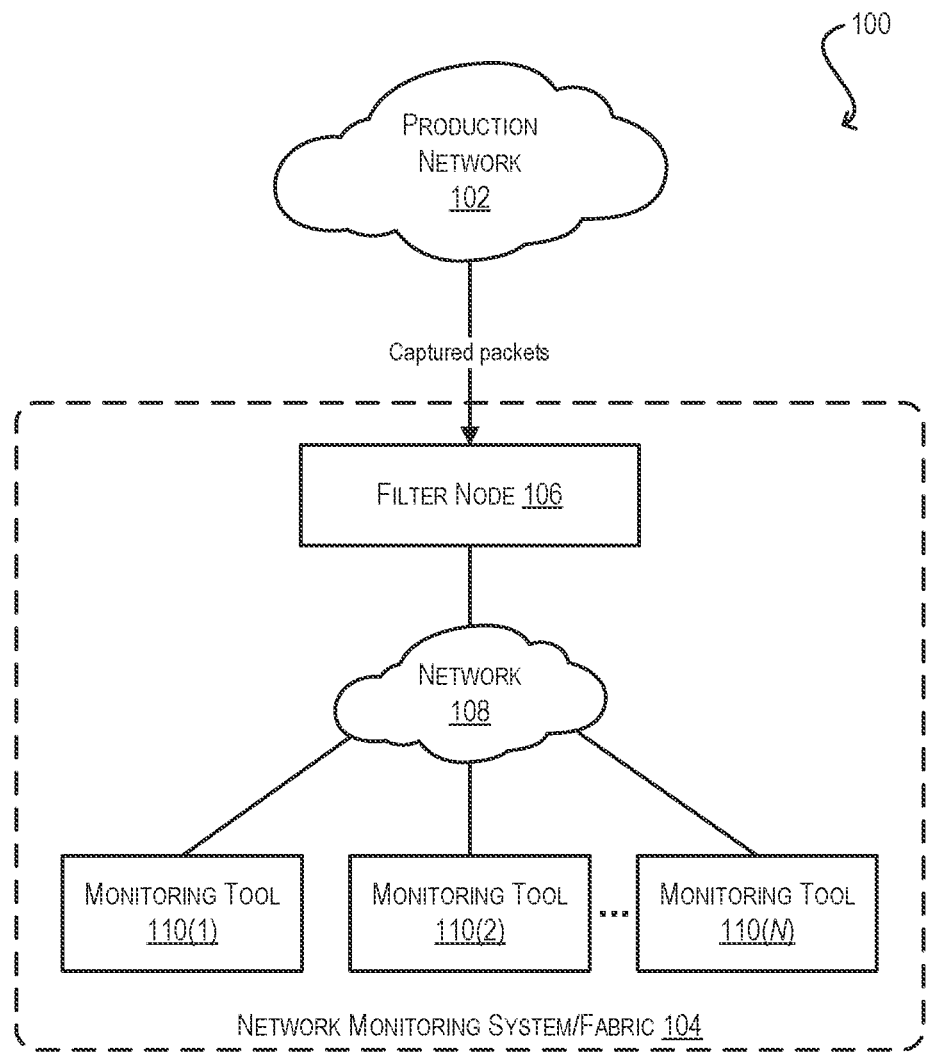
FIG. 1 depicts an example environment in accordance with certain embodiments of the present disclosure.

FIG. 1 is a simplified block diagram of an example environment 100 in which the techniques of the present disclosure may be implemented. As shown, environment 100 includes a production network 102 that is communicatively coupled with a network monitoring system/fabric 104. Production network 102 may be, e.g., a data center or service provider network. Monitoring system/fabric 104 comprises, among other things, a filter node 106 that is connected via a network 108 to a set of monitoring tools 110(1)-(N). Although only a single filter node 106 is depicted for purposes of illustration, any number of these filter nodes may be included in monitoring system/fabric 104.

In accordance with the present disclosure, filter node 106 is a network device (e.g., a network switch or router) that receives network traffic (packets) captured within production network 102 and aggregates/filters the captured traffic for delivery to one or more of monitoring tools 110(1)-(N). For example, the network traffic may be captured within production network 102 via TAP (test access point) devices or SPAN/mirror ports configured on the switches and routers of production network 102.

Upon receiving a captured packet on an ingress interface (port), filter node 106 typically attempts to match the packet to one or more monitoring policies. These monitoring policies comprise rules that define the types of network traffic that should be collected and analyzed by monitoring system/fabric 104. For example, the monitoring policies may be configured by an administrator or other user of monitoring system/fabric 104. If the captured packet matches a monitoring policy, it is considered a "monitored" packet and is transmitted by filter node 106 over network 108 to one or more appropriate monitoring tools 110 for further processing. This further processing can include, for instance, analyzing the contents of the monitored packet for security and/or other reasons and logging the monitored packet in a persistent data store.

As mentioned previously, filter node 106 usually inserts monitoring-related metadata into a monitored packet prior to sending it out to a monitoring tool. This metadata may specify, e.g., an identifier (ID) of the filter node where the packet entered monitoring system/fabric 104 (i.e., filter node 106), an ID of the specific filter node ingress port on which the packet was received, and an ID of the monitoring policy that the packet was matched to. The insertion of such metadata enables the monitored packet to be sent to a specific monitoring tool, and/or allows the receiving monitoring tool to process the monitored packet, in a manner that is consistent with or responsive to the metadata. For example, the receiving monitoring tool may apply a particular security analysis to monitored packets that were matched to a particular policy or were received on a particular filter node/ingress port.

In existing network monitoring systems/fabrics, the foregoing metadata is inserted into a monitored packet using virtual local area network (VLAN) tags in accordance with the IEEE 802.1q standard. Under the 802.1q standard, a network packet (or more precisely, an Ethernet frame) can have up to two VLAN tags—an inner VLAN tag and an outer VLAN tag—each comprising 12 bits. However, there are several problems with this approach. First, if the monitored packet already has a VLAN tag at the time of being captured in production network 102, filter node 106 can only add one additional VLAN tag to the packet for holding monitoring-related metadata. This single additional VLAN tag is not large enough to hold all of the metadata that is typically inserted into such packets (e.g., a filter node ID, an ingress port ID, and a monitoring policy ID). As an alternative, filter node 106 can overwrite the existing VLAN tag with a new VLAN tag, but this is undesirable. As yet another alternative, filter node 106 can add more than one additional VLAN tag to the packet for holding monitoring-related metadata (such that the packet has a total of three or more VLAN tags), but this may cause issues for some network devices.

Second, due to the inclusion of the metadata in Layer 2 (L2) VLAN tags, network 108 of monitoring system/fabric 104 must be an L2 network and the forwarding of monitored packets within network 108 must be policy-based using VLAN ID matching. As a result, the network devices of network 108 must be specialized devices that are dedicated for use within monitoring system/fabric 104, rather than off-the-shelf L2/L3 switches or routers.

Third, inserting monitoring-related metadata into one or more VLAN tags of a monitored packet necessarily modifies the packet itself. This means that certain properties of the monitored packet, such as its original checksum, will no longer be valid or recoverable.

Figure 2:
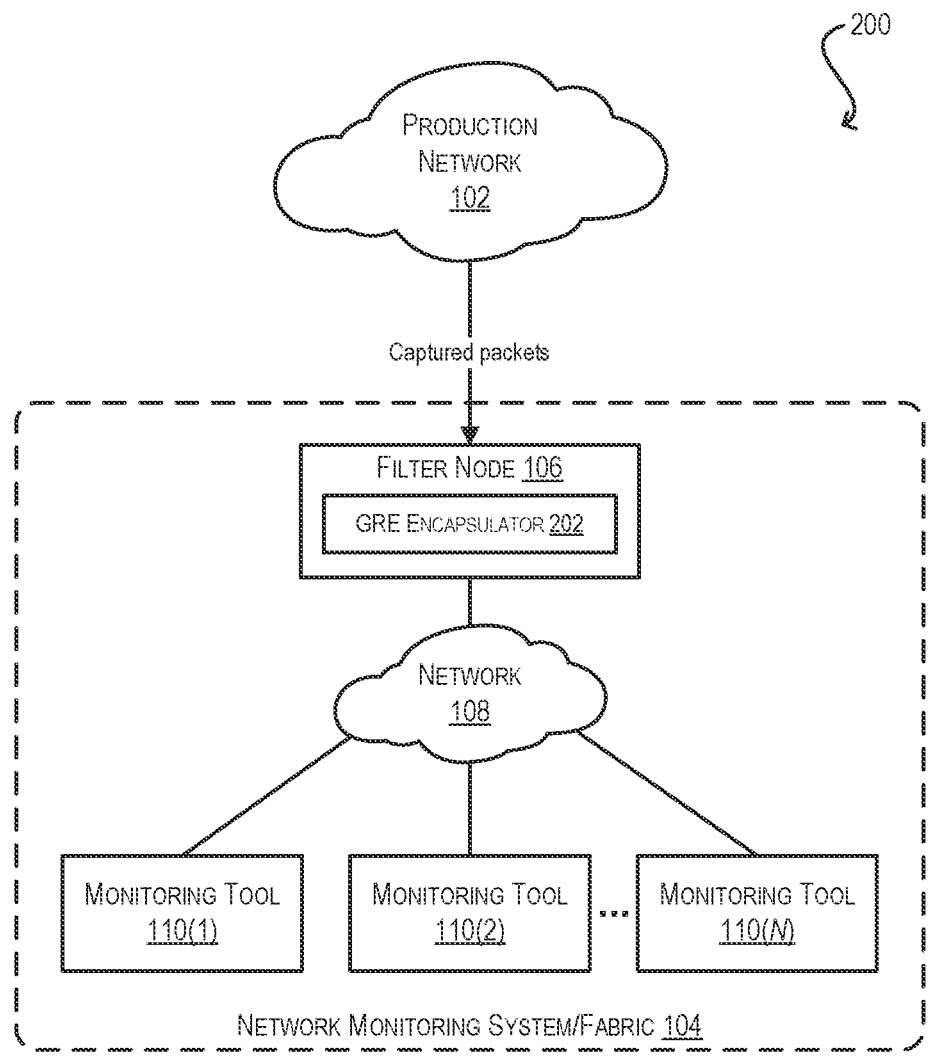
FIG. 2 depicts another version of the example environment of FIG. 1 in accordance with certain embodiments of the present disclosure.

To address the foregoing and other related issues, FIG. 2 depicts an enhanced version 200 of environment 100 that includes within filter node 106 a novel GRE encapsulator 202 according to certain embodiments. GRE encapsulator 202 may be implemented in software, hardware, or a combination thereof. Generally speaking, GRE encapsulator 202 allows filter node 106 to encapsulate monitored packets into GRE packets for tunneling through network 108 to monitoring tools 110(1)-(N). As noted previously, GRE is a standardized tunneling protocol that is defined in Request for Comments (RFC) 2784 created by the Internet Engineering Task Force (IETF).

As part of encapsulating a given monitored packet M into a GRE packet G, GRE encapsulator 202 can (1) insert M in an unmodified form into a payload portion of G, and (2) insert monitoring-related metadata for M into a header portion of G, where the header portion has a new GRE header format that is different from the standard GRE header format and is specifically modified to accommodate the metadata. FIG. 3 depicts the standard GRE header format (reference numeral 300) per RFC 2784, which spans 8 bytes (64 bits) and includes various configuration settings at bits 0-3 (including a "Key Present" bit at bit 2), a 9-bit "Reserved" field starting at bit 4, a 3-bit "ver" field starting at bit 13, 16-bit "Protocol type" field starting at bit 16, and a 32-bit "undefined" field starting at bit 32 that can be used for various purposes. If the Key Present bit (bit 2) is set, the 32-bit undefined field acts as a "GRE Key" field. As explained in further detail below, the new GRE header format(s) of the present disclosure expands the standard GRE header format shown in FIG. 3 with new fields (and/or re-partitions the standard format's GRE Key field) in a manner that ensures the GRE header has sufficient space to hold all relevant metadata for a monitored packet.

Upon completing the encapsulation process, filter node 106 can route monitored packet M in its encapsulated form (i.e., as GRE packet G) over network 108 to one or more of monitoring tools 110(1)-(N). Finally, each receiving monitoring tool 110 (or some other device connected to tool 110) can decapsulate GRE packet G into original monitored packet M and can process M in accordance with the packet's associated metadata (as found in the header of G).

With the general approach above, a number of advantages are realized. First, because GRE packet G utilizes a new (i.e., non-standard) GRE header format that is particularly designed to accommodate monitoring-related metadata, there is plenty of space in the header portion of G to hold the metadata of monitored packet M. This metadata can include the ID of the filter node where M was received, the ID of the filter node ingress port on which M was received, the ID of the monitoring policy that M was matched to, and potentially other information (e.g., one or more timestamps indicating the time at which M was received at the filter node). In contrast, the VLAN tagging approach described previously is significantly more constrained in terms of the amount of monitoring-related metadata that can be carried with the monitored packet.

Second, by encapsulating monitored packets into GRE packets that can be tunneled over any L3 network, the approach of the present disclosure allows network 108 of monitoring system/fabric 104 to be implemented using off-the-shelf switches/routers that use standard L2 forwarding and L3 routing protocols, rather than dedicated L2 devices that use policy-based VLAN forwarding.

Third, because monitored packet M is carried in an unmodified form in the payload of GRE packet G, the integrity of M remains intact upon reaching monitoring tools 110(1)-(N). As a result, certain properties of M like its original checksum remain valid/recoverable, which may be useful for analysis purposes.

The following sections provide additional details regarding particular implementations of the foregoing approach according to certain embodiments, including descriptions of example non-standard GRE header formats that may be employed for holding monitoring-related metadata. It should be appreciated that FIGS. 1 and 2 are illustrative and not intended to limit embodiments of the present disclosure. For example, in some embodiments GRE encapsulator 202 may reside on a network device in production network 102 rather than on filter node 106 of monitoring system/fabric 104. In these embodiments, the network device in the production network may be responsible for matching captured packets to monitoring policies and encapsulating the monitored packets into GRE packets (for delivery to a monitoring tool) in accordance with the techniques described herein.

2. Packet Processing Workflow

Figure 4:
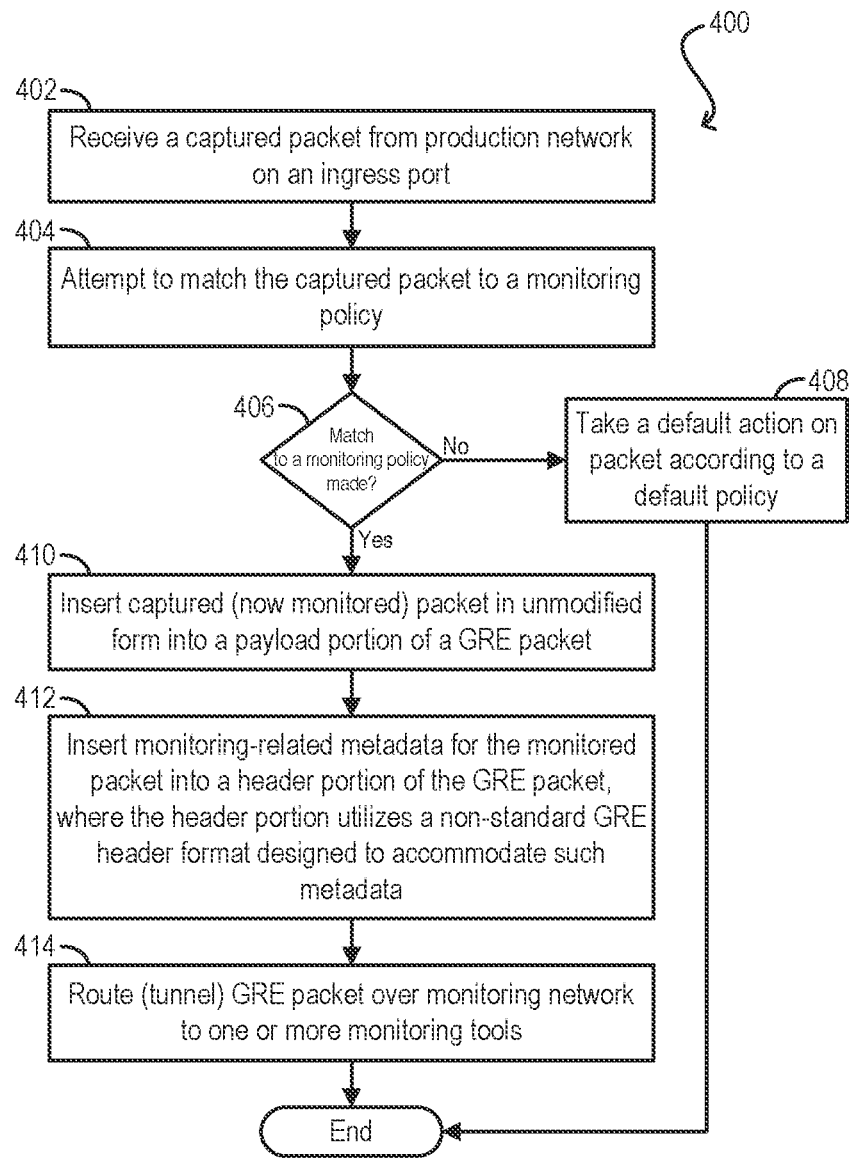
FIG. 4 depicts a packet processing workflow in accordance with certain embodiments of the present disclosure.

FIG. 4 depicts a workflow 400 that may be performed by filter node 106 of FIG. 2 for processing a captured packet received from production network 102 according to certain embodiments, which can include encapsulating the packet using GRE encapsulator 202 into a GRE packet with a non-standard GRE header.

Starting with block 402, filter node 106 can receive, on an ingress port of the node, a network packet captured in production network 102. As mentioned previously, this packet may have been captured via a TAP device or a SPAN/mirror port in production network 102.

At block 404, filter node 106 can attempt to match the captured packet to a monitoring policy in a group of such policies maintained by the filter node. These monitoring policies, which may be configured/created by an administrator or user of monitoring system/fabric 104, define rules that identify which captured packets are of interest for monitoring purposes. For example, one monitoring policy may have a rule specifying the destination IP address 100.100.100.1, such that all captured packets directed to this destination IP address will match the policy.

If the captured packet is not matched to any monitoring policy (block 406), filter node 106 can take a default action on the packet (block 408) and workflow 400 can end. For example, filter node 106 may match the packet to a default (non-monitoring) policy at block 404, and can take the default action specified in the default policy. This default action may involve, e.g., forwarding the packet to some default destination with specific tags signaling this fact. Alternatively, the default action may involve simply dropping the packet. However, if the captured packet is matched to a monitoring policy at block 406, filter node 106 can encapsulate the captured packet using GRE by inserting the captured packet as-is (i.e., in unmodified form) into a payload portion of a GRE packet (block 410) and inserting monitoring-related metadata for the captured packet into a header portion of the GRE packet, where the header portion utilizes a non-standard GRE header format designed to accommodate such metadata (block 412). The specific types of metadata inserted at block 412 and the specific non-standard GRE header format used can vary according to different embodiments. Examples of these non-standard GRE header formats are described in Section (3) below.

Finally, at block 414, filter node 106 can route (tunnel) the GRE packet to one or more monitoring tools 110(1)-(N) over network 108 and workflow 400 can end. In some embodiments, the particular monitoring tool(s) that are targeted for receiving the GRE packet can be determined based on the metadata inserted at block 412.

3. Example Non-Standard GRE Header Formats

FIGS. 5-8 present four non-standard GRE header formats 500-800 respectively that may be employed by certain embodiments of the present disclosure. These example formats are provided for illustrative purposes and one of ordinary skill in the art will recognize various modifications, variations, and alternatives.

Non-standard GRE header format 500 depicted in FIG. 5 is an expanded format, or in other words a format that includes additional fields beyond the standard GRE header format depicted in FIG. 3. These additional fields comprise a 16-bit "Protocol subtype" field starting at bit 64, a 16-bit "Version" field starting at bit 80, a 16-bit "Switch-id" field starting at bit 96, a 16-bit "Port-id" field starting at bit 112, a 16-bit "Policy-id" field starting at bit 128, and a 16-bit "Reserved" field starting at bit 144, resulting in a total header size of 160 bits (or 20 bytes). In addition, format 500 partitions the existing 32-bit GRE Key field starting at bit 32 into two parts: a 16-bit "Entropy" field and a 16-bit "Reserved" field.

The Protocol subtype and Protocol type fields are used by network devices to parse the GRE header, and thus the values in these fields can indicate the particular header format they are found in. For example, in FIG. 5, the Protocol subtype field is populated with the value 0x5 and the Protocol field is populated with the value 0xD28B, which indicates the layout of format 500. These values are user-configurable and can be set to any value, as long as the sending and receiving network devices agree (i.e., are configured to use/recognize the same value(s) for a particular header format). The Version field can hold a version number associated with the protocol subtype (e.g., 0x1). The Switch-id field can hold the ID of the filter node that received the monitored packet included in the current GRE packet. The Port-id field can hold the ID of the filter node ingress port on which that monitored packet was received. The Policy-id field can hold the ID of the monitoring policy that was matched to the monitored packet. And the Entropy field can hold entropy data useable for hashing the current GRE packet (for, e.g., load balancing purposes).

Non-standard GRE header format 600 depicted in FIG. 6 is another expanded format that is similar to format 500 of FIG. 5 but moves the Entropy field to the end of the header and moves the Protocol subtype field next to the Protocol type field. Format 600 also removes the two Reserved fields from format 500, resulting in a total header size of 128 bits (or 16 words). As shown in FIG. 6, the Protocol subtype and Protocol type values for format 600 are defined to be 0x6 and 0xD28B respectively, although other values are possible. Format 600 may be more useful or appropriate in certain scenarios over format 500 because it offers an expanded header format in a more compact size.

Non-standard GRE header format 700 depicted in FIG. 7 is yet another expanded format that is similar to format 500 of FIG. 5 but adds two further 32-bit fields that collectively represent a 64-bit timestamp, resulting in a total header size of 256 bits (or 32 words). The first 32-bit timestamp field starts at bit 160 and represents the "seconds" portion of the timestamp since the last epoch, and the second 32-bit timestamp field starts at bit 192 and represents the nanoseconds within the current second. These timestamp fields can collectively indicate the time at which the monitored packet included in the current GRE packet was received at the filter node identified by the Switch-id field, either according to the UTC or TAI time scales. As shown in FIG. 7, the Protocol subtype and Protocol type values for format 700 are defined to be 0x7 and 0xD28B respectively, although other values are possible. For example, the Protocol subtype value can differ depending on whether the timestamp is a UTC or TAI timestamp.

Finally, non-standard GRE header format 800 depicted in FIG. 8 is a non-expanded format, or in other words a format that is the same size as the standard GRE header format depicted in FIG. 3. In format 800, the Key Present bit is set and the GRE Key field is partitioned into three sub-fields: an 8-bit Switch-id field, a 12-bit Port-id field, and a 12-bit Policy-id field. This partitioning scheme allows all three of these monitoring-related metadata to be included in the GRE header without expanding its size beyond 64 bits. As shown in FIG. 8, the Protocol type value for format 800 is defined to be 0x88B5, although other values are possible.

4. Example Network Device

Figure 9:
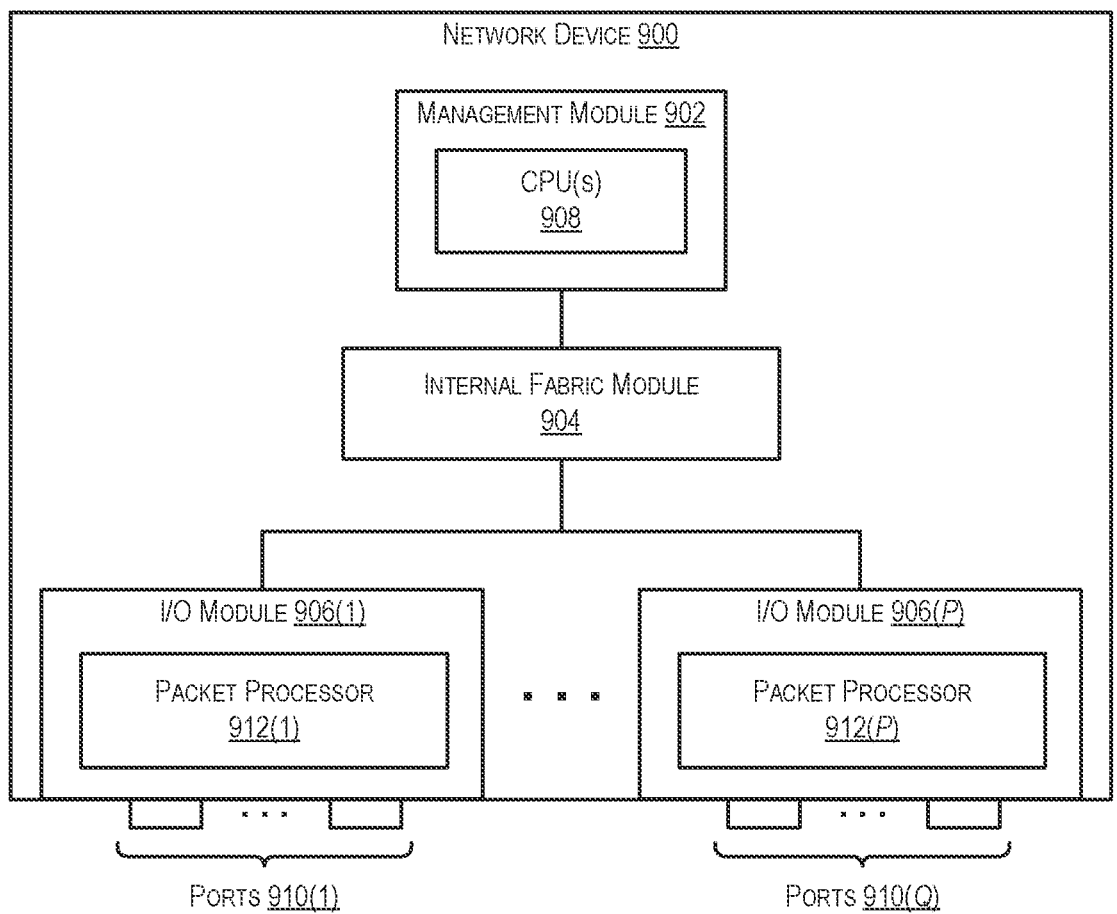
FIG. 9 depicts an example network device in accordance with certain embodiments of the present disclosure.

FIG. 9 depicts an example network device 900 according to certain embodiments of the present disclosure. In one set of embodiments, network device 900 may be used to implement filter node 106 of FIGS. 1 and 2.

As shown in FIG. 9, network device 900 includes a management module 902, an internal fabric module 904, and a number of I/O modules 906(1)-(P). Management module 902 includes one or more management CPUs 908 for managing/controlling the operation of the device. Each management CPU 908 can be a general-purpose processor, such as an Intel/AMD x86 or ARM-based processor, that operates under the control of software stored in an associated memory (not shown). In certain embodiments, one or more of the techniques described in the present disclosure may be executed wholly, or in part, by management CPUs 908.

Internal fabric module 904 and I/O modules 906(1)-(P) collectively represent the data, or forwarding, plane of network device 900. Internal fabric module 904 is configured to interconnect the various other modules of network device 900. Each I/O module 906 includes one or more input/output ports 910(1)-(Q) that are used by network device 900 to send and receive network packets. Each I/O module 906(1)-(P) can also include a packet processor 912. Packet processor 912 is a hardware processing component (e.g., an application specific integrated circuit (ASIC) or field-programmable gate array (FPGA)) that can make wire speed decisions on how to handle incoming or outgoing network packets. In certain embodiments, one or more of the techniques described in the present disclosure may be implemented wholly, or in part, within packet processors 912(1)-912(P).

It should be appreciated that network device 900 is illustrative and many other configurations having more or fewer components than network device 900 are possible.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular workflows and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments may have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the present disclosure as set forth in the following claims.

The invention claimed is:

1. A method performed by a network device in a network monitoring system or fabric, the network device being communicatively coupled with a production network and with a monitoring tool of the network monitoring system or fabric, the method comprising:
   receiving, on an ingress port of the network device, a network packet captured in the production network;
   matching the network packet to a monitoring policy in a plurality of monitoring policies, each monitoring policy including one or more rules that identify network packets of interest to the monitoring tool for monitoring purposes;
   encapsulating the network packet into a Generic Routing Encapsulation (GRE) packet, the encapsulating comprising:
      inserting the network packet in an unmodified form into a payload portion of the GRE packet; and
      inserting monitoring-related metadata for the network packet into a header portion of the GRE packet, wherein the header portion uses an expanded GRE header format that is larger in size than a standard GRE header format, wherein the monitoring-related metadata includes an identifier of the ingress port of the network device on which the network packet was received and an identifier of the monitoring policy to which the network packet was matched, wherein the identifier of the ingress port is inserted into a first portion of the expanded GRE header format that extends beyond an end of the standard GRE header format, and wherein the identifier of the monitoring policy is inserted into a second portion of the expanded GRE header format that extends beyond the end of the standard GRE header format; and
   transmitting the GRE packet to the monitoring tool of the network monitoring system or fabric.

2. The method of claim 1 wherein the monitoring-related metadata further includes an identifier of the network device, and wherein the identifier of the network device is inserted into a third portion of the expanded GRE header format that extends beyond the end of the standard GRE header format.

3. The method of claim 1 wherein the monitoring-related metadata further includes a timestamp indicating a time at which the network packet was received at the network device, and wherein the timestamp is inserted into a third portion of the expanded GRE header format that extends beyond the end of the standard GRE header format.

4. The method of claim 1 wherein an identifier of the expanded GRE header format is inserted into a third portion of the expanded GRE header format.

5. The method of claim 4 wherein the third portion is a 16-bit protocol subtype field that begins at bit 32 of the expanded GRE header format.

6. The method of claim 4 wherein a version number associated with the identifier of the expanded GRE header format is inserted into a fourth portion of the expanded GRE header format.

7. The method of claim 1 wherein the monitoring-related metadata further includes entropy data used for hashing the network packet, and wherein the entropy data is inserted into a third portion of the expanded GRE header format that extends beyond the end of the standard GRE header format.

8. A network device that is part of a network monitoring system or fabric, the network device being communicatively coupled with a production network and with a monitoring tool of the network monitoring system or fabric, the network device comprising:
   a plurality of ports; and
   a processor configured to:
      receive, on an ingress port in the plurality of ports, a network packet captured in the production network;
      attempt to match the network packet to a monitoring policy in a plurality of monitoring policies, each monitoring policy including one or more rules that identify network packets of interest to the monitoring tool for monitoring purposes;
      encapsulate the network packet into a Generic Routing Encapsulation (GRE) packet by:
         inserting the network packet in an unmodified form into a payload portion of the GRE packet; and
         inserting monitoring-related metadata for the network packet into a header portion of the GRE packet, wherein the header portion uses an expanded GRE header format that is larger in size than in a standard GRE header format, wherein the monitoring-related metadata includes an identifier of the ingress port on which the network packet was received and an identifier of the monitoring policy to which the network packet was matched, wherein the identifier of the ingress port is inserted into a first portion of the expanded GRE header format that extends beyond an end of the standard GRE header format, and wherein the identifier of the monitoring policy is inserted into a second portion of the expanded GRE header format that extends beyond the end of the standard GRE header format; and
transmit the GRE packet to the monitoring tool of the network monitoring system or fabric.

9. The network device of claim 8 wherein the monitoring-related metadata further includes an identifier of the network device, and wherein the identifier of the network device is inserted into a third portion of the expanded GRE header format that extends beyond the end of the standard GRE header format.

10. The network device of claim 8 wherein the processor is further configured to:
upon determining that the network packet cannot be matched to any of the plurality of monitoring policies, performing a default action on the network packet according to a default policy.

11. The network device of claim 8 wherein the network device is a network switch or a network router that uses a standard Layer 2 switching protocol and/or a standard Layer 3 routing protocol.

12. The network device of claim 8 wherein the monitoring-related metadata further includes one or more values identifying the expanded GRE header format, and wherein the one or values are inserted into a third portion of the expanded GRE header format.

13. A non-transitory computer readable storage medium having stored thereon program code executable by a network device, the network device being communicatively coupled with a production network and with a monitoring tool of a network monitoring system or fabric, the program code causing the network device to perform a method comprising:
receiving, on an ingress port of the network device, a network packet traversing through the production network;
matching the network packet to a monitoring policy in a plurality of monitoring policies, each monitoring policy including one or more rules that identify network packets of interest to the monitoring tool for monitoring purposes;
encapsulating the network packet into a Generic Routing Encapsulation (GRE) packet, the encapsulating comprising:
inserting the network packet into a payload portion of the GRE packet; and
inserting monitoring-related metadata for the network packet into a header portion of the GRE packet, wherein the header portion uses a non-standard GRE header format that is larger in size than a standard GRE header format, wherein the monitoring-related metadata includes an identifier of the ingress port on which the network packet was received and an identifier of the monitoring policy to which the network packet was matched, wherein the identifier of the ingress port is inserted into a first portion of the non-standard GRE header format that extends beyond an end of the standard GRE header format, and wherein the identifier of the monitoring policy is inserted into a second portion of the non-standard GRE header format that extends beyond the end of the standard GRE header format; and
transmitting the GRE packet to the monitoring tool of the network monitoring system or fabric.

14. The non-transitory computer readable storage medium of claim 13 wherein the production network is monitored via the network monitoring system or fabric.

15. The non-transitory computer readable storage medium of claim 13 wherein the network packet is not modified prior to being inserted into the payload portion of the GRE packet, such that a checksum of the network packet is recoverable when the network packet is decapsulated from the GRE packet.

16. The non-transitory computer readable storage medium of claim 13 wherein the network device is a filter node in the network monitoring system or fabric, or a device in a production network that is monitored via the network monitoring system or fabric.

17. The non-transitory computer readable storage medium of claim 13 wherein the monitoring-related metadata further includes an identifier of the network device, and wherein the identifier of the network device is inserted into a third portion of the non-standard GRE header format that extends beyond the end of the standard GRE header format.

* * * * *